United States Patent
Shimosato et al.

(10) Patent No.: US 7,231,703 B2
(45) Date of Patent: Jun. 19, 2007

(54) DEBURRING METHOD AND AUTOMOTIVE KNUCKLE

(75) Inventors: Toru Shimosato, Nagano-ken (JP); Tsutomu Suzuki, Nagano-ken (JP); Kazuhiro Kobayashi, Nagano-ken (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 11/460,357

(22) Filed: Jul. 27, 2006

(65) Prior Publication Data

US 2006/0263159 A1 Nov. 23, 2006

Related U.S. Application Data

(62) Division of application No. 10/642,200, filed on Aug. 18, 2003, now Pat. No. 7,104,559.

(30) Foreign Application Priority Data

Aug. 21, 2002 (JP) ............... 2002-240162

(51) Int. Cl.
*B23P 3/00* (2006.01)
*B23P 15/00* (2006.01)

(52) U.S. Cl. .............. 29/557; 409/132; 409/138; 409/140; 409/143

(58) Field of Classification Search .......... 29/557–558; 409/131–132, 138–140, 143; 408/1 R
See application file for complete search history.

(56) References Cited

U.S. PATENT DOCUMENTS

| | | | |
|---|---|---|---|
| 2,359,954 A * | 10/1944 | Whipple ............. 86/19.7 |
| 2,855,811 A | 10/1958 | Fried | |
| 3,170,224 A * | 2/1965 | Johnson ............. 408/188 |
| 3,212,405 A * | 10/1965 | Smith ............. 409/132 |
| 3,895,439 A * | 7/1975 | Ehrenberg et al. ............. 30/171 |
| 4,138,926 A * | 2/1979 | Hoglund ............. 409/297 |
| 6,179,532 B1 | 1/2001 | Oldham | |
| 6,196,639 B1 | 3/2001 | Di Ponio et al. | |
| 6,364,073 B1 | 4/2002 | Fierro et al. | |
| 6,497,540 B1 | 12/2002 | Shikata et al. | |
| 2003/0215295 A1* | 11/2003 | Gaiser et al. ............. 408/59 |
| 2005/0095072 A1 | 5/2005 | Gaiser et al. | |

FOREIGN PATENT DOCUMENTS

DE 3313007 A1 * 10/1984
DE 3727103 A1 * 2/1989

(Continued)

*Primary Examiner*—Monica Carter
*Assistant Examiner*—Eric A. Gates
(74) *Attorney, Agent, or Firm*—Greenblum & Bernstein, P.L.C.

(57) ABSTRACT

A knuckle 1 has a through hole 3 provided in a fitting hole 4 thereof. A cutting tool 9, which has a diameter being larger than that of the through hole 3 and also has a cutting part having a hemispherical leading end portion, is caused to go into the through hole 3 at an angle at which the tool 9 does not touch the remaining part of the knuckle 1. Then, a burr formed at a fitting-hole-side open end portion 7 of the through hole 3 is removed by rotating the cutting tool 9 while the leading end portion thereof is made to obliquely abut against the open end portion 7 of the through hole 3.

6 Claims, 1 Drawing Sheet

FOREIGN PATENT DOCUMENTS

| | | | |
|---|---|---|---|
| DE | 3732773 A1 * | 4/1989 |
| JP | 04336908 A * | 11/1992 |
| JP | 7-117548 | 5/1995 |
| JP | 10128610 A * | 5/1998 |
| JP | 11-255907 | 9/1999 |
| JP | 2000246610 A * | 9/2000 |
| JP | 200180307 | 3/2001 |
| JP | 2002122250 A * | 4/2002 |

* cited by examiner

DEBURRING METHOD AND AUTOMOTIVE KNUCKLE

CROSS REFERENCE TO RELATED APPLICATIONS

This application is a divisional application of application Ser. No. 10/642,200, filed on Aug. 18, 2003 now U.S. Pat. No. 7,104,559, which disclosure is hereby expressly incorporated by reference herein which, in turn, claims priority to JP 2002-240162, which disclosure is also incorporated by reference herein in its entirety herein.

BACKGROUND OF THE INVENTION

The present invention relates to a deburring method for removing a burr formed at an open end portion of a through hole, and to a deburred automotive knuckle.

Hitherto, as disclosed in the Unexamined Japanese Patent Application Publication No. 2001-80307 and the Examined Japanese Patent Application Publication No. Hei7-117548, a wheel speed sensor of an automobile has been fixedly mounted therein in a radial direction with respect to an axle.

When this wheel speed sensor is attached to an automotive knuckle, a through hole is drilled toward an inner surface of a fitting hole, into which a wheel bearing is fitted, from a radially outward direction. The wheel speed sensor is fixedly attached thereto from this through hole.

However, when the through hole is drilled in the inner surface of the fitting hole provided in the knuckle, a burr occurs on the inner surface portion of the fitting hole, which is an open end portion of the through hole. To remove the burr, the following manual processing is performed. That is, first, a special tool having a cutting part is carefully inserted into the through hole from the outside thereof. When the cutting part is projected into the fitting hole from the open end portion of the through hole, the cutting part is outthrust in such a way as to abut against the open end portion of the through hole. Then, the cutting part is rotated to thereby remove the burr. Upon completion of deburring, the tool having the cutting part is returned to a central portion of the through hole. Finally, the tool is drawn out of the through hole.

An operation of performing processing by using such a special tool is troublesome. Moreover, even an operation of setting the tool at an object to be processed requires high precision, because the tool is advanced and retreated through the through hole.

SUMMARY OF THE INVENTION

An object of the invention is to provide a deburring method of removing a burr formed at an open end portion of a through hole without performing a troublesome operation of advancing and retreating a special tool from the outside of the through hole.

To solve the problems, according to a first aspect of the invention, there is provided a deburring method, which comprises the steps of inserting a cutting tool, which has a diameter being larger than that of the through hole and also has a cutting part that has a hemispherical leading end portion, into an open end portion of a through hole of an object, which is to be processed, at an angle at which the tool does not touch the remaining part of the object, and removing a burr formed at the open end portion of the through hole by rotating the cutting tool while simultaneously making the leading end portion of the cutting tool obliquely abut against the open end portion of the through hole.

Further, according to a second aspect of the invention, there is provided a deburring method for removing a burr formed at an open end portion of a through hole that is opened to an inner surface of a fitting hole formed in an automotive knuckle so that a wheel bearing is fitted into the fitting hole. This deburring method comprises the steps of inserting a cutting tool, which has a diameter being larger than that of the through hole and also has a cutting part that has a hemispherical leading end portion, into an open end portion of a through hole of an object, which is to be processed, at an angle at which the tool does not touch the remaining part of the knuckle, and removing the burr by rotating the cutting tool while simultaneously making the leading end portion of the cutting tool obliquely abut against the open end portion of the through hole.

According to a third aspect of the invention, there is provided an automotive knuckle having a fitting hole to which a wheel bearing is fitted. This automotive knuckle comprises a through hole opened in an inner surface of the fitting hole. In this knuckle, an open end portion of the through hole is deburred by inserting a cutting tool, which has a diameter being larger than that of the through hole and also has a cutting part that has a hemispherical leading end portion, thereinto at an angle at which the tool does not touch the remaining part of the knuckle. A burr formed at the open end portion of the through hole is removed by rotating the cutting tool while simultaneously making the leading end portion of the cutting tool obliquely abut against the open end portion of the through hole. The contour of the open end portion is shaped nearly like an ellipsoid having a major axis and a minor axis.

According to the first, the second and the third aspects of the invention, deburring can be achieved only by using a cutting tool having a cutting part, whose leading end portion is hemispherical, without using a special tool similarly as the related art does. Further, the positioning of the cutting tool can easily be achieved only by setting the hemispherical leading end portion of the cutting tool at an angle at which the cutting tool does not touch the remaining unprocessed part of the knuckle that is an object to be processed. Thus, automatic processing by a machine is enabled.

DETAILED DESCRIPTION OF THE PREFERRED EMBODIMENTS

Hereinafter, an embodiment of the invention is described in detail with reference to FIGS. 1 to 3.

Figure 1:
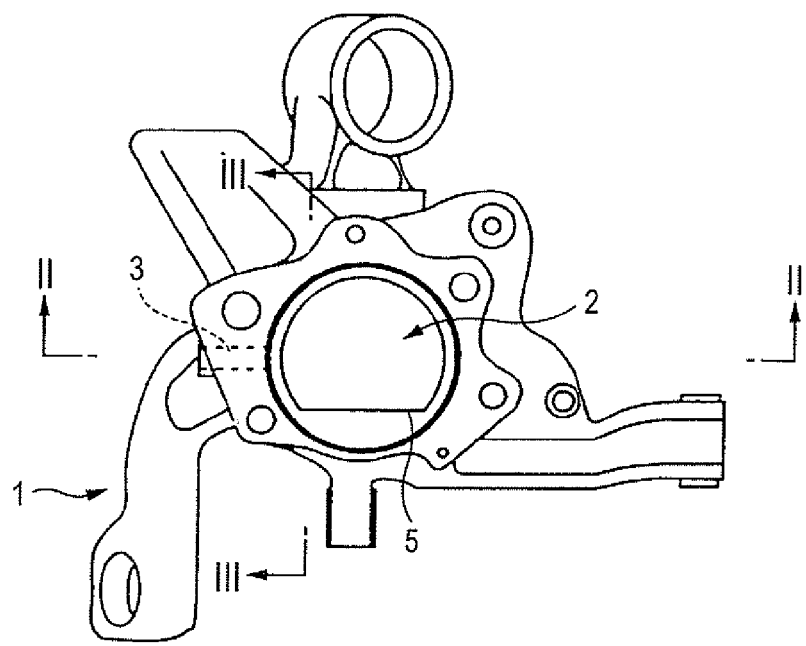
FIG. 1 is a plan view illustrating a knuckle according to an embodiment of the invention.

FIG. 1 shows an automotive knuckle 1 according to an embodiment of the invention. A fitting hole 2, to which a wheel bearing (for example, a ball bearing) is fitted, is constituted by a cylindrical concave portion, and is provided in the central portion of the knuckle 1.

Cutting, such as finish boring, is performed on the knuckle 1 after cast processing thereof.

The fitting hole 2 of the knuckle 1 consists of a cylindrical inner surface 4, which is fitted onto the ball bearing that is a wheel bearing, and of a bottom portion 6. The ball bearing is put on a ring-like step portion 5 provided in the vicinity of the bottom portion 6.

A through hole 3 is provided in such a way as to be opened in an inner surface 4 of the fitting hole 2 and as to be passed through the knuckle from an outer surface of the knuckle 1. Because the through hole 3 is provided perpendicularly to the inner surface 4 of the fitting hole 2, boring cannot be performed with a drill from the inner surface 4. Therefore, the boring is performed from the outer surface of the knuckle 1. Thus, a burr is produced on the inner surface 4 of the fitting hole 2 by boring.

A cutting tool, which has a diameter being larger than that of the through hole 3 and also has a hemispherical cutting part provided at a leading end thereof, for example, a ball end mill 9 is made to obliquely go into the fitting hole of the knuckle 1, which is an object to be processed, at an angle of, for instance, 45°. Then, the leading end portion of the ball end mill 9 is made to abut against an open end portion 7 of the through hole 3. Moreover, deburring (or cutting) is performed by rotating the ball end mill 9. In this embodiment, when an entrance angle, at which the ball end mill 9 goes into the fitting hole, is, for example, 45°, the entire peripheral edge part of the open end portion 7 can reliably be deburred without contact of the ball end mill 9 with the through hole 3 except the open end portion 7 thereof.

The leading end portion of the ball end mill 7 is hemispherically shaped and has a cutting part. The diameter of the ball end mill 7 is larger than that of the through hole 3. Thus, even when the entrance angle is 45°, the deburring of the peripheral part of the open end portion of the through hole 3 can be performed.

Figure 3:
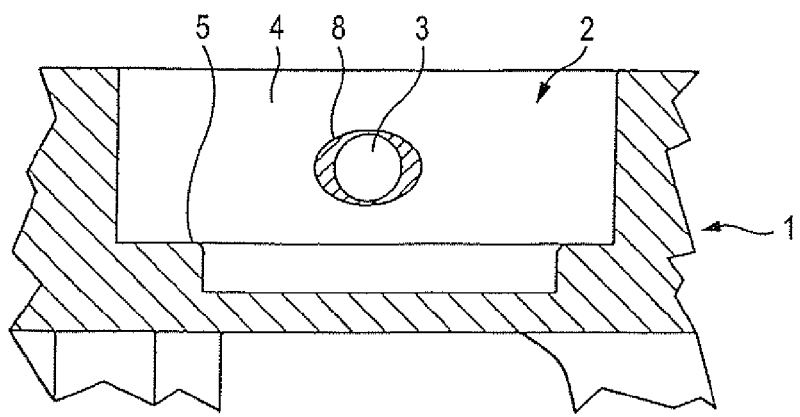
FIG. 3 is a sectional view taken on line III-III of FIG. 1.

Because the inner surface 4 of the fitting hole 2 of the knuckle 1 is cylindrical, the contour of a deburred open end portion 8 of the through hole 3 has an ellipsoidal shape whose transverse axis is longer than the longitudinal axis thereof, as illustrated in FIG. 3, when viewed from the front of the knuckle 1.

Figure 2:
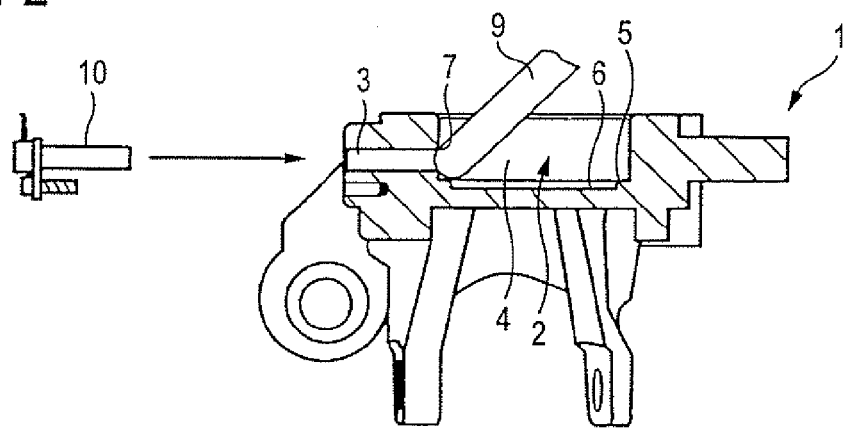
FIG. 2 is a sectional view taken on line II-II of FIG. 1.

Upon completion of deburring by using the ball end mill 9, a wheel speed sensor 10 is fixedly attached to the through hole 3, as shown in FIG. 2.

Incidentally, the invention is not limited to this embodiment. Various modifications may be made without departing from the spirit and scope of the invention.

For example, although the fitting hole 2 of the knuckle 1 of the aforementioned embodiment has the bottom portion 6 and is a concave part, the fitting hole may be passed through the knuckle 1 to the back surface thereof.

Further, the shape of the inner surface of the fitting hole is not limited to the cylindrical one. The inner surface of the fitting hole may have any shape as long as the inner surface thereof is a surface to be processed, which is caved in like a bag similarly to the inner surface 4 of the fitting hole 2 of the knuckle 1. Even when the object to be processed is another kind of an object provided with a through hole having an open end portion, to which deburring cannot be performed perpendicularly, similar advantages are obtained.

Furthermore, although the ball end mill is used as the cutting tool in the aforementioned embodiment, other chamfering tools may be used as long as each of the chamfering tools has a diameter being larger than that of the through hole 3 and also has a hemispherical cutting part provided at the leading end portion thereof

What is claimed is:

1. A deburring method comprising the steps of: inserting a cutting tool into an open end portion of a through hole of an automotive knuckle to be processed, the cutting tool having a diameter being larger than that of the through hole and also having a cutting part that has a hemispherical leading end portion, at an angle at which the tool does not touch the remaining part of the knuckle; rotating the cutting tool while simultaneously making the leading end portion of the cutting tool obliquely abut against the open end portion of the through hole; and removing a burr formed at the open end portion of the through hole.

2. The deburring method according to claim 1, wherein the angle of the cutting tool relative to a central axis of the through hole is 45 degrees.

3. The deburring method according to claim 1, wherein the cutting tool is a ball end mill.

4. A deburring method for removing a burr formed at an open end portion of a through hole that is opened to an inner surface of a fitting hole formed in an automotive knuckle, a wheel bearing being fitted into the fitting hole, the deburring method comprising the steps of: inserting a cutting tool into an open end portion of a through hole of the knuckle, which is to be processed, at an angle at which the tool does not touch the remaining part of the knuckle, the cutting tool having a diameter being larger than that of the through hole and also having a cutting part that has a hemispherical leading end portion; rotating the cutting tool while simultaneously making the leading end portion of the cutting tool obliquely abut against the open end portion of the through hole; and removing the burr formed at an open end portion of a through hole.

5. The deburring method according to claim 4, wherein the angle of the cutting tool relative to a central axis of the through hole is 45 degrees.

6. The deburring method according to claim 4, wherein the cutting tool is a ball end mill.

* * * * *